United States Patent [19]
Fagniart

[11] 4,056,138
[45] Nov. 1, 1977

[54] FLEXIBLE PLASTIC CONTAINER
[75] Inventor: Gaston Fagniart, Valenciennes, France
[73] Assignee: Societe Anonyme dite: BORACIER, Switzerland
[21] Appl. No.: 669,975
[22] Filed: Mar. 24, 1976
[30] Foreign Application Priority Data
Apr. 3, 1975 France .................................. 75.11149
[51] Int. Cl.² ............................................. B65D 1/00
[52] U.S. Cl. .................................................... 150/.5
[58] Field of Search ........................ 150/.5, 1; 222/107
[56] References Cited
U.S. PATENT DOCUMENTS

| 2,685,316 | 8/1954 | Krasno | 150/.5 |
| 2,950,029 | 8/1960 | Winstead | 222/143 |
| 3,354,924 | 11/1967 | Birrell | 150/.5 |
| 3,638,835 | 2/1972 | Goodrich | 150/1 X |
| 3,727,803 | 4/1973 | Cobb | 150/.5 X |

Primary Examiner—Donald F. Norton
Attorney, Agent, or Firm—Robert E. Burns; Emmanuel J. Lobato; Bruce L. Adams

[57] ABSTRACT

A flexible plastics container for loose products in bulk, e.g. 500 to 2000 liters, and having relatively thick walls, e.g. about 1 mm, is rendered flexible by providing the container with at least one plane of symmetry and forming preliminary fold lines, preferably of a W-shape cross-section, in the immediate vicinity of and along the line of intersection of the plane of symmetry with the walls. The two halves defined by the plane of symmetry can then be folded into each other. In a four-walled container a further folding of the two overlying sets of walls gives a flat article. The container is ideally formed by a blow moulding process in which the mould has an impression which forms the preliminary folds simultaneously with the walls. The mould may be provided with means for increasing and reducing pressure against different walls of the container while within the mould so that the folding operation can be carried out in the mould.

3 Claims, 5 Drawing Figures

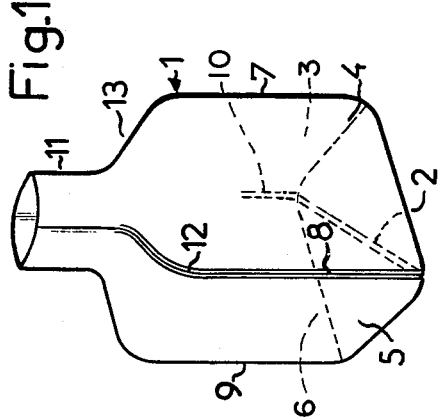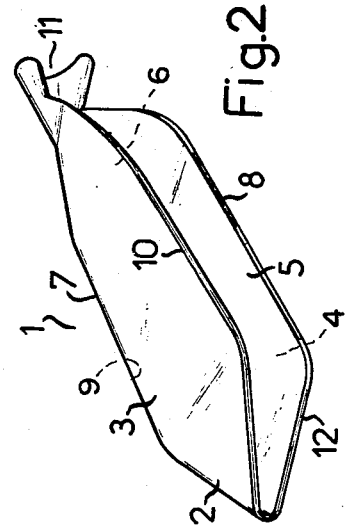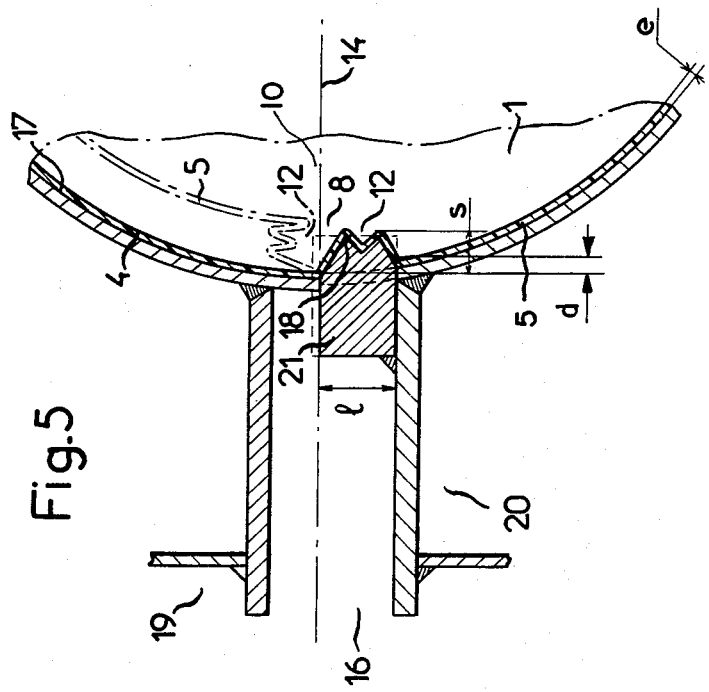

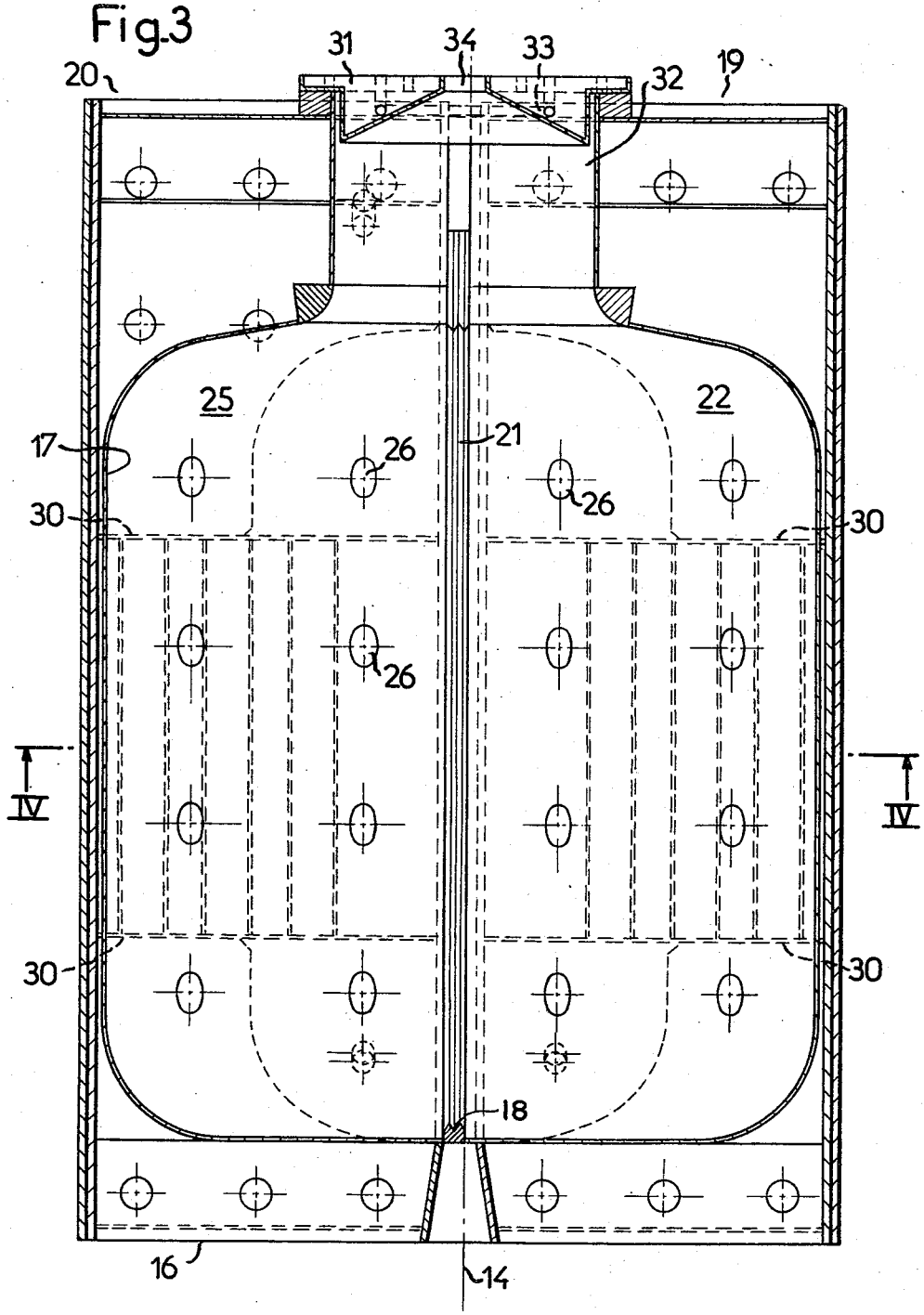

FLEXIBLE PLASTIC CONTAINER

BACKGROUND OF THE INVENTION

The present invention relates to a container of plastics material having preliminary folds, as well as to a process and a mould for the manufacture of a container of this kind.

More particularly, the invention relates to containers particularly intended for packing pulverous materials in bulk and in large quantities, thus having a considerable volume, e.g. of the order of 500–2000 liters.

It is obviously of advantage to be able to transport and store such containers folded, when they are empty, in view of the great amount of space which they occupy in use.

The numerous folding and packing systems at present known, using gussets or folded flaps, prove unsatisfactory in the case of this type of container because of the lack of flexibility in their walls, which have to be of sufficient thickness to provide good mechanical strength; this thickness may amount to about a millimeter.

A further method of reducing the space occupied by empty containers during their storage and transport would be to make them in several parts, to be welded together when the time came for their use, but this solution likewise proves unsatisfactory, as it results in potential rupturing points in the finished container.

As the container requires considerable mechanical strength, desirably combined with very limited wall thickness, the mechanical properties of the container must be homogenous, so that it must be manufactured in one single piece and folded subsequently, if it is desired to reduce the space occupied by it in storage and transport.

As the various folding systems at present known do not prove satisfactory, an object of the present invention is to provide a container so designed that it can be folded without difficulty, despite the thickness of its walls, as well as a manufacturing process for a container of this kind and a mould enabling the process to be applied. The blow moulding method is preferred.

SUMMARY OF THE INVENTION

According to the present invention, there is provided a container of flexible plastics material, intended in particular for packing pulverous materials in bulk and in large quantities. The container has at least one plane of symmetry intersecting its walls, and it characterised by the presence, in the immediate vicinity of and along the intersection of said plane of symmetry with its walls, of preliminary folds enabling adjacent walls to be folded over along the line of symmetry, whereby the container may be folded in the form of two halves fitted into each other.

When the container takes the form of a rectangular parallelepiped of which at least two parallel faces are square, it can even be folded completely flat, which enables the space occupied by the container to be considerably reduced. In tests, twelve containers of 500 liters have thus been reduced to a total volume of one cubic meter.

The preliminary folds are preferably slightly offset in relation to the plane of symmetry, and are accordingly positioned on walls to be folded over rather than on the plane itself. Additionally, the walls to be folded over are preferably slightly offset towards the interior of the pocket at least in the immediate vicinity of the preliminary folds, in relation to the walls over which they are to be folded. In this way, the operation of folding a container according to the invention presents no difficulty, whatever its thickness. It will be appreciated that these offsets in fact make the container slightly asymmetrical, but it still remains substantially symmetrical within the requirements of the present invention viz. that one half of the container can be folded into the other half along what is substantially a plane of symmetry.

As regards the manufacturing process according to the invention, this comprises forming, during moulding of the container, preliminary folds on the walls of the container, in the immediate vicinity of and along their intersection with said plane of symmetry, and folding adjacent walls along said preliminary folds and across said plane of symmetry, in order to fit the two halves of the container into each other.

According to a preferred feature of the process according to the invention, the walls of the container and their preliminary folds are produced simultaneously by the blow moulding process, inside a mould.

When using the blow moulding method, the folding operation may be carried out inside the actual mould, by the effect of a pressure difference between the interior of the container and the external faces of the walls to be folded over.

The mould of the present invention comprises at least one chill having an internal surface which is symmetrical at least in relation to one plane and forms a cavity corresponding to the external contours of a container including, along and in the immediate vicinity of the intersection of the internal face of the chill with said plane of symmetry, the impression of a preliminary fold for the wall of the container.

The invention will be understood more clearly by reference to the following description relating, by way of example only, to one embodiment of a container according to the present invention, and a mould and method for manufacturing the container, making reference to the accompanying drawings.

BRIEF DESCRIPTION OF THE DRAWINGS

FIG. 1 is a perspective view of a container according to the invention, having a square base, FIG. 2 is a view of the same container when folded, FIG. 3 is a sectional side elevation of a mould enabling the container to be produced by the blow moulding process, the section being along the vertical plane of symmetry III—III of FIG. 4, FIG. 5 is an enlarged detail taken from FIG. 4, at the level of the junction between the two chills of the mould.

DETAILED DESCRIPTION

Figure 4:
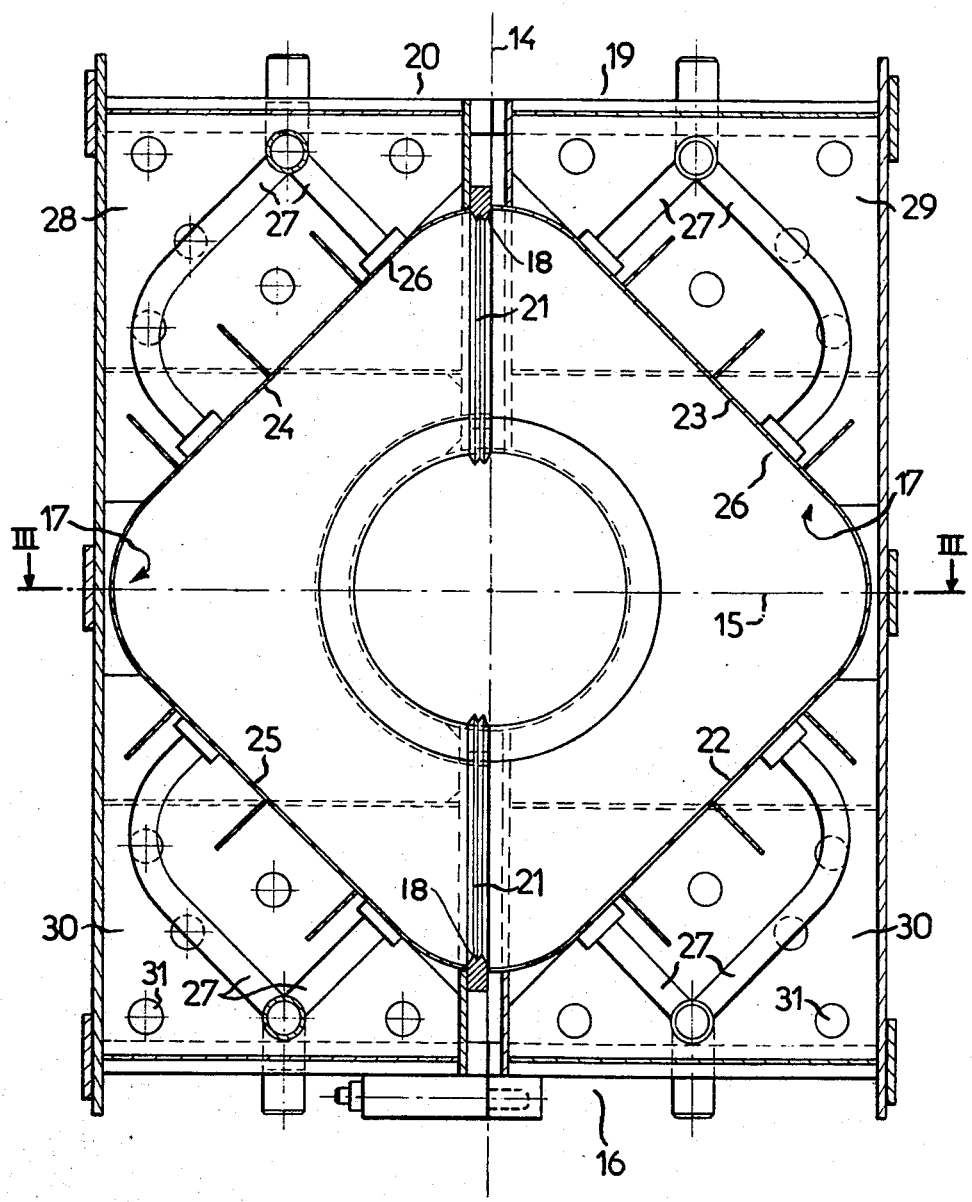
FIG. 4 is a transverse sectional view of the mould as seen from below, the section being along the horizontal plane IV—IV of FIG. 3.

Referring to the accompanying drawings, FIG. 1 shows a container 1 according to the invention, of substantially parallelepipedal shape. This container is defined by a square wall horizontal base 2, to the edges of which are connected four vertical rectangular side walls 3 to 6, in mutual contact along vertical edges 7 to 10. Each of the vertical walls 3 to 6 is inclined towards the horizontal at its top, at the level of which the container has a substantially cylindrical neck 11. The different walls defining the container are preferably connected to one another without any sharp corners, as shown in particular in FIG. 5, in which the full, curved lines show connection of the two vertical walls 4 and 5 of the container in the immediate vicinity of their connecting edge 8. Also, as noted above, the entire container 1 consists of plastic material, and constitutes a homogeneous body to provide high mechanical strength.

Constructed in this manner, the container 1 has two perpendicular planes of general symmetry, consisting of the two diagonal planes defined respectively by the edges 7-9 and 8-10 of the container.

According to the invention, a container of any shape, but having at least one plane of symmetry, will be provided in the immediate vicinity of and along the intersection of the said plane of symmetry with its walls, with preliminary folds, which, as shown, are integral with and interconnect mutually adjacent walls 4,5 and 3,6 and also extend across bottom 2, enabling each wall to be folded over along its line of symmetry and the container to be folded in the form of two halves fitted into each other.

In the case of a container having an at least partly polyhedral shape, the preliminary folds are preferably situated in the immediate vicinity of and along contact edges between two adjacent faces of the polyhedron.

In the Example illustrated in FIG. 1, the container 1 and as best shown in FIG. 2 has a continuous preliminary fold 12 along the edges 8 and 10, and along the diagonal line across the base 2 by which these two edges are joined. This preliminary fold 12 is continued at the top 13 of the container as far as the neck 11 of the latter, which in the example illustrated is without a fold.

Preferably, as illustrated more precisely in FIG. 5, the preliminary fold 12 is situated a small distance away from the plane of symmetry, such as the diagonal plane 14 defined by the two edges 8 and 10, and is situated on one and the same side of this plane, as shown on the wall 5 which is to be folded into wall 4.

Furthermore, at least in the immediate vicinity of the preliminary folds, the walls 5 and 6 are preferably offset towards the interior of the container, in relation to the walls 4 and 3 respectively, into which they are to be folded (FIG. 2), which latter operation is thus rendered easier. In the example illustrated the entire container is, accordingly, slightly asymmetrical in relation to the diagonal plane 14. The offset of walls 5, 6 to the interior, at the diagonal plane 14, which offset is marked $d$ in FIG. 5, may be of the order of a few millimeters for a container of which the walls have a thickness $e$ of the order of one millimeter (considerably enlarged in FIG. 5), this being sufficient to enable the folding operation to be effected.

The preliminary fold 12 may take various different forms as regards its cross section, but satisfactory results have been obtained with the shape shown in FIG. 5, that of a W, with the base of the W facing towards the interior of the container. The width $l$ of the preliminary fold 12 may be of the order of a few centimeters, e.g. 2 to 3 centimeters, and the projection $s$ formed towards the interior of the container may be of the order of one centimeter (see FIG. 5). Needless to say, these figures are given purely for information and may vary, particularly in accordance with the size of the container to be produced and the thickness of its wall.

Designed on these lines, the container according to the invention can easily be given the shape shown in FIG. 2, which refers to the particular case of a container with a square base.

In this case, representing the commonest example of a container only having one plane of symmetry, and starting with the container opened out and occupying its maximum volume, as illustrated in FIG. 1, each wall, such as 5 and 6, is folded over along its line of symmetry in relation to the plan of symmetry 14, by folding along the preliminary fold 12. In the course of this folding operation the two walls 3 and 4 remain fixed in relation to each other, as does that half of the base 2 which is defined by the lower edges of these walls and by the diagonal of this base joining the etwo edges 8 and 10. At the end of the operation the junction edge 9 between the walls 5 and 6 positions itself along the junction edge 7 between the walls 3 and 4, the walls 5 and 6 practically adjoining the walls 4 and 3, and the second half of the base 2 is superimposed on the aforementioned first half (see also FIG. 5, in which the dot-and-dash lines show the wall 5 after this folding operation).

In the particular case illustrated, in which the container has a second plane of symmetry perpendicular to the first, consisting of the second diagonal plane defined by the edges 7 and 9, this folding operation may be initiated by subjecting the walls to be folded to stresses of which the resultant is situated in the said second plane of symmetry.

In this particular case a second folding operation can be effected, as a result of which the container 1 acquires the shape illustrated in FIG. 2. When the container takes the form of two halves fitted into each other, as is the case at the end of the first folding operation, the said second folding operation consists of the action of folding towards each other the two sets of superimposed walls 5-4 and 6-3 respectively, in order to superimpose the corresponding four walls. This folding operation is effected by rotating about the two adjacent edges 7 and 9 the base 2 of the container, which then bends outwards around its diagonal normally joining the edges 7 and 9, and about its junction edges with the rectangular faces 3 to 6.

At the end of this second folding operation the four rectangular walls 3 to 6 are superimposed, as are also the four quarters of the base 2 which are defined by the diagonals of this latter, each of these quarters being situated in the continuation of the rectangular walls 3 to 6 with which it is normally in contact.

At the neck 11, which has a smaller diameter than the horizontal section of the container over the remainder of its height, the folding operation can be regarded as equivalent to that effected on the base, except that the neck 11 is simply folded in the form of two halves fitted into each other.

Preferably, in order not to cause any break in the continuity which would detract from the mechanical strength of the container according to the invention, the latter is manufactured in one single piece, by the blow moulding process.

As is known, this process consists of the production of a parison mould, the closing of the mould 16 around it, the application of an excess pressure to the interior of the parison mould by comparison with the exterior in order to apply it against the impression of the mould and form the container, and the cooling of the entire assembly before removal from the mould. According to the invention, the preliminary folds 12 are moulded simultaneously with the walls of the container.

An example of a mould which can be used for this purpose is that shown in FIGS. 3 to 5.

This mould comprises, in the known manner, at least one chill having an internal face reproducing in the form of a cavity, inside the mould, the external relief of a container to be moulded. In this case the said internal face is naturally symmetrical in respect of at least one plane; in the example of the container illustrated in FIGS. 1 and 2 it is symmetrical in respect of two perpendicular planes 14 and 15, corresponding to the two diagonal planes of symmetry of the container.

According to the invention, the mould has the impression means 18 of the preliminary fold 12 of the wall of the container, this impression means being situated along and in the immediate vicinity of the intersection of one of the said planes, in the present case 14, with the internal face 17 of the chill, as shown in FIGS. 3, 4 and 5.

In the example illustrated, in which the mould 16 consists of two chills 19 and 20 substantially symmetrical in respect of the plane 14, and in contact with each other along this plane, the impression means 18 is formed by a joint 21 interposed between the two chills, in the immediate vicinity of and along the plane of symmetry 14.

Preferably, in order to give the container the preferred shape described above, the impression means 18 is slightly offset from the plane 14, on the same side of the latter, and the joint 21 forms, for example, an integral part of the chill 20 of which the purpose is to give the required shape to the two walls 5 and 6 which are to be folded over.

Similarly, in the immediate vicinity of the impression mans 18, at least one part of the internal face of the chill 20 is slightly offset, towards the interior of the mould, in relation to its line of symmetry, i.e. in relation to the internal face of the chill 19. In the example illustrated it is the whole of the internal face of the chill 20 which is slightly offset, towards the interior of the mould, in relation to the internal face of the chill 19, the internal face 17 being thus slightly asymmetrical in respect of the plane 14.

In view of the considerable force having to be exerted in order to fold a container in accordance with the invention in the form of two halves fitted into each other, and in view of the thickness indispensible in its walls and the size of the latter, it is of advantage to effect this folding operation by applying a pressure difference between the interior of the container and the external faces of the walls to be folded over. In the case of blow-moulding this operation can be easily carried out during the cooling of the mould and of the container, producing a pressure drop inside the latter and an excess pressure outside, on the walls to be folded over, in order to cause them to bend around the preliminary folds. A pressure drop outside the pocket, on the walls opposite to the walls to be folded over, can be produced at the same time, in order to apply them against the internal face of the mould during the folding operation.

For this purpose the four zones 22 to 25 of the internal face 17 of the mould, which are intended for the purpose of forming the four walls 3 to 6 of the container respectively, have orifices such as 26, through which channels such as those marked 27 lead to the interior of the mould. Each of these orifices is protected with a grating (not shown) in order to prevent the plastics material from which the container is to be formed from finding its way from the inside of the mould to said channel.

The channels 27 of the chill 20 of the mould, which lead into the zones 24 and 25 corresponding to the walls 5 and 6 of the container which are to be folded over, are capable of being connected, alternately, to a vacuum source, facilitating the thermo-blowing of the container and to a source of compressed gas, or simply to the open air, in order to fold the container over after it has been shaped. The channels 27 leading into the zones 22 and 23 of the second chill 19 of the mould, which correspond to the fixed walls 3 and 4 of the container, are themselves connected to a vacuum source, both in the course of the thermo-shaping process and during the folding operation, thus keeping the shaped faces 3 and 4 of the container in the correct position in the course of the said folding operation. The sources of vacuum and of compressed gas, being well known, are not shown.

It should be noted that the particular shape which is selected for the impression means 18, which has already been described and which produces the preliminary fold 12, enables this impression means to function as a seal preventing the passage of compressed gas from the chill 20 to the chill 19 of the mould during the folding operation.

Needless to say, the mould 16 just described can be constructed in various known ways.

It will preferably be provided with cooling means enabling the setting of the material forming the container to be accelerated. These cooling means comprise, for example, a chamber provided in the mould, around the internal face 17 of this latter. In the example illustrated each chill 19-20 of the mould is of the "mechanically wielded" type, being formed from an assembly of metal sheets of which some define the internal face 17 of the mould while the others, connected to the first sheets by sets of stiffening devices such as 30, define with these latter, inside each chill, at least one chamber such as that marked 28 or 29, in which cooling liquid or cooling gas can be circulated. Needless to say, the stiffening devices 30 are carefully positioned and provided with orifices such as 31 in order to facilitate the said circulation.

Finally, the mould 16 has a cover 31 enabling it to be hermetically closed at its zone 32 corresponding to the neck 11 of the pocket, which constitutes its only means of access from the outside when its two chills are assembled. The cover 31, like the other parts of the mould, has a cooling circuit 33. It is also provided with an orifice 34 which enables a gas under pressure to be injected inside the container, in order to effect the blow-moulding process, and which enables a pressure drop to be produced inside the said container in order to facilitate the folding of the latter when, after the shaping, its two faces 5 and 6 are folded over along faces 3 and 4.

Other constructional versions of the mould 16 could naturally be adopted without thereby departing from the principle of the invention. The mould could be obtained, for example by casting in a foundry; it could comprise more than two chills, in particular in accordance with the shape of the container to be moulded, which is not limited to the one shaped described.

The process covered by the invention can likewise be varied in a number of ways as alternatives in the example described, the most suitable method of folding for each particular pocket shape being left to the judgment of the qualified technician concerned.

What is claimed is:

1. A foldable container, comprising:
walls of plastic material defining a homogeneous container of high mechanical strength generally shaped as a polyhedron, each wall defining a face of the polyhedron, the body having a mouth at one end of the walls and a base at another end thereof and having a plane of general symmetry extending between such walls diagonally of the polyhedron; and
preliminary folds integral with such walls and with portions of the base, extending in the immediate vicinity of and along the plane of general symmetry, to interconnect such walls and base portions and to permit the container body to be folded about the preliminary folds, said folds having a general cross-sectional shape of a W extending into the interior of said container body, the W being offset relative to said body to a slight extent such that one pair of the walls, when the body is folded, practically adjoins another pair of the walls of the polyhedron,
whereby said container body is slightly asymmetrical relative to said plane of general symmetry, and storage of the folded container body, as well as the folding thereof, is thus facilitated.

2. A container according to claim 1, wherein the body also has a second plane of general symmetry perpendicular to the first-mentioned plane, for effecting the folding by subjecting the walls to be folded to forces the resultant of which acts in the second plane.

3. A container according to claim 2, wherein the polyhedron has a rectangular parallelepiped form.

* * * * *